United States Patent
Lee et al.

(10) Patent No.: US 10,246,612 B2
(45) Date of Patent: Apr. 2, 2019

(54) ADHESIVE TAPE

(71) Applicant: LG Chem, Ltd., Seoul (KR)

(72) Inventors: Jae-Hwang Lee, Ulsan (KR); Jang-Soon Kim, Seongnam-si (KR); Ae-Jung Jang, Anyang-si (KR); Ji-Hye Kim, Bucheon-si (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/650,368

(22) PCT Filed: Oct. 7, 2013

(86) PCT No.: PCT/KR2013/008943
§ 371 (c)(1),
(2) Date: Jun. 8, 2015

(87) PCT Pub. No.: WO2014/092318
PCT Pub. Date: Jun. 19, 2014

(65) Prior Publication Data
US 2015/0315424 A1 Nov. 5, 2015

(30) Foreign Application Priority Data
Dec. 11, 2012 (KR) .................. 10-2012-0143301

(51) Int. Cl.
| | |
|---|---|
| *C09J 183/04* | (2006.01) |
| *C09J 7/40* | (2018.01) |
| *C09J 133/00* | (2006.01) |
| *C09J 7/20* | (2018.01) |
| *C09J 7/26* | (2018.01) |
| *C09J 7/21* | (2018.01) |

(52) U.S. Cl.
CPC .............. *C09J 7/401* (2018.01); *C09J 7/201* (2018.01); *C09J 7/21* (2018.01); *C09J 7/26* (2018.01); *C09J 133/00* (2013.01); *C09J 183/04* (2013.01); *C09J 2201/128* (2013.01); *C09J 2433/00* (2013.01); *C09J 2475/006* (2013.01); *C09J 2483/00* (2013.01); *Y10T 428/249983* (2015.04)

(58) Field of Classification Search
CPC .. C09J 133/00; C09J 183/04; C09J 2201/128; C09J 2433/00; C09J 2475/006; C09J 2483/00; C09J 7/0228; C09J 7/0289; C09J 7/046; Y10T 428/249983
USPC .......................................... 428/212
See application file for complete search history.

(56) References Cited

U.S. PATENT DOCUMENTS

| | | | |
|---|---|---|---|
| 5,928,772 A * | 7/1999 | Shiraishi ............. | B29C 44/1228 156/250 |
| 6,555,210 B1 * | 4/2003 | Masuda ............. | G03G 15/0233 361/225 |
| 2004/0231252 A1 * | 11/2004 | Benjamin ............... | E04F 13/04 52/79.1 |
| 2006/0141884 A1 * | 6/2006 | Haque ...................... | B32B 5/06 442/361 |

FOREIGN PATENT DOCUMENTS

| | | |
|---|---|---|
| CN | 101747847 A | 6/2010 |
| JP | 10001645 A | 1/1998 |
| JP | 2004253764 A | 9/2004 |
| JP | 2010155969 A | 7/2010 |
| KR | 100964618 B1 | 5/2009 |
| KR | 1020100041653 A | 4/2010 |

OTHER PUBLICATIONS

Chinese Office Action dated Dec. 28, 2015 in connection with the counterpart Chinese Patent Application No. 201380064335.3.
International Search Report for PCT/KR2013/008943 dated Dec. 17, 2013.

* cited by examiner

*Primary Examiner* — Lawrence D Ferguson
(74) *Attorney, Agent, or Firm* — Lerner, David, Littenberg, Krumholz & Mentlik, LLP

(57) ABSTRACT

Provided is an adhesive tape which sequentially comprises a first adhesive layer, a polyurethane foamed layer having a density of about 0.1 g/cm3 to about 0.5 g/cm3, and a second adhesive layer.

2 Claims, No Drawings

ADHESIVE TAPE

TECHNICAL FIELD

The present invention relates to an adhesive tape.

BACKGROUND ART

In electric/electronic industries, bonding or fixing of components is an important matter. Particularly, there is much difficulty in boding two or more rigid materials or parts to one another.

Examples of bonding of rigid materials or parts may include attaching a polycarbonate bezel to a rigid part such as a glass touch panel of a display.

In this case, such rigid materials or parts may be stacked on opposite surfaces of an adhesive tape, respectively, whereby the rigid materials or parts can be bonded to one another through the adhesive tape.

DISCLOSURE

Technical Problem

It is an aspect of the present invention to provide an adhesive tape capable of being used in bonding of a TV bezel to enhance durability.

Technical Solution

In accordance with one aspect of the present invention, an adhesive tape sequentially includes a first adhesive layer, a polyurethane foamed layer having a density of about 0.1 g/cm$^3$ to about 0.5 g/cm$^3$, and a second adhesive layer.

The polyurethane foamed layer may have a compressive strength of about 100 gf/in$^2$ to about 2000 gf/in$^2$.

The polyurethane foamed layer may have a tensile strength of about 2 kgf/in$^2$ to about 20 kgf/in$^2$.

The adhesive tape may have a shear strength of about 0.3 kg/cm$^2$ to about 1.0 kg/cm$^2$ at 80° C.

The polyurethane foamed layer may have a thickness of about 0.2 mm to about 5.0 mm.

The adhesive layers may include at least one selected from the group of consisting of acrylic adhesives, rubber adhesives, silicone adhesives, and combinations thereof.

The adhesive tape may be used in bonding of a TV bezel.

The adhesive tape may have a width of about 1 mm to about 7 mm.

Advantageous Effects

The adhesive tape is used in bonding of a TV bezel to prevent warpage and separation, thereby suppressing light leakage and improving durability.

BEST MODE

Hereinafter, embodiments of the present invention will be described in detail. However, it should be understood that the present invention is not limited to the following embodiments and should be defined only by the accompanying claims and equivalents thereof.

In accordance with one embodiment of the present invention, an adhesive tape sequentially includes a first adhesive layer, a polyurethane foamed layer having a density of about 0.1 g/cm$^3$ to about 0.5 g/cm$^3$, and a second adhesive layer.

The adhesive tape has stress relaxation properties by including a soft polyurethane foamed layer having the density range set forth above.

Specifically, the polyurethane foamed layer may have a compressive strength of about 100 gf/in$^2$ to about 2,000 gf/in$^2$ and a tensile strength of about 2 kgf/in$^2$ to about 20 kgf/in$^2$.

The polyurethane foamed layer may have pores with an average diameter of 50 microns to 200 microns.

The adhesive tape is used as a medium for bonding of electronic components, and is useful for bonding a narrow TV bezel by virtue of stress relaxation properties as described above.

When two materials to be bonded have different coefficients of expansion at high temperature, there occur problems of warpage, separation, and the like. Since the adhesive tape has good stress relaxation properties as described above, the adhesive tape can suppress these problems. For example, when a polycarbonate TV bezel is bonded to a glass panel, the bezel suffers from warpage in an opposite direction to the glass panel, which can result in separation of the bezel, causing light leakage. When the adhesive tape is used in boding of a TV bezel, there are advantages in that the adhesive tape can suppress warpage, separation, and the like, thereby enhancing durability while inhibiting light leakage.

Since the adhesive tape has good stress relaxation properties as described above, the adhesive tape does not require a high level of shear strength at high temperature necessary for preventing separation when used in bonding of a TV bezel. Specifically, the adhesive tape may have a shear strength of about 0.3 kg/cm$^2$ or higher at 80° C., more specifically about 0.4 kg/cm$^2$ to about 1.0 kg/cm$^2$ at 80° C.

The polyurethane foamed layer may be formed by any method known in the art, and may be formed, for example, by foaming a polyurethane resin containing heat-expandable micro-particles to prepare foams.

The polyurethane foamed layer may have a thickness of about 0.2 mm to about 5.0 mm within this range, the adhesive tape can have predetermined stress relaxation properties, and can be useful, for example, for bonding a TV bezel.

The first adhesive layer and the second adhesive layer may be prepared using, for example, acrylic adhesives, rubber adhesives, silicone adhesives, or combinations thereof, or may be prepared using any adhesives known in the art.

Specifically, the first adhesive layer and the second adhesive layer may be prepared to have shear strength at high temperature within the range as set forth above. Desired shear strength at high temperature may be realized by adjustment of curing degree of adhesives.

Since the adhesive tape has good stress relaxation properties as described above, the adhesive tape can provide good durability even when used in bonding of a narrow TV bezel, while suppressing light leakage. Specifically, the adhesive tape may have a width of about 1 mm to about 7 mm when used for narrow TV bezels.

Hereinafter, the present invention will be described in more detail with reference to some examples. It should be understood that these examples are provided for illustration only and are not to be construed in any way as limiting the present invention.

EXAMPLE

Example 1

A composition for polyurethane foamed layers was coated onto a release paper having a first adhesive layer formed of the acrylic adhesive composition, followed by curing, thereby forming a 1.5 mm thick soft polyurethane foamed layer. The soft polyurethane foamed layer had a density of 0.2 g/cm$^3$, a compressive strength (Texture analysis, stable micro systems) of 980 gf/in$^2$, and a tensile strength (Texture analysis, stable micro systems) of 9.1 kgf/in$^2$. Next, the acrylic adhesive composition was coated again onto the polyurethane foamed layer to a thickness of 50 μm, and then subjected to drying and solidification to form a second adhesive layer, followed by stacking release treated PET, thereby preparing an adhesive tape.

Example 2

An adhesive was formed using a rubber adhesive composition instead of the acrylic adhesive composition used in Example 1. The rubber adhesive composition was prepared in the form of syrup with a solid content of 20% by weight using a styrene-isoprene-styrene (SIS) linear block copolymer in a toluene solvent. Next, an adhesive enhancer for improving adhesive properties was added to the syrup in an amount of 80 parts by weight based on 100 parts by weight of a rubber, followed by defoaming at room temperature subsequent to stirring for 1 hour. The resulting adhesive composition was coated onto a silicone-coated PET release film, followed by drying in an oven at 80° C. for 1 minute, and then at 110° C. for 2 minutes, thereby forming a first adhesive layer.

Next, a polyurethane foamed layer was formed in the same manner as in Example 1, followed by forming a second adhesive layer using the rubber adhesive composition, thereby preparing an adhesive tape.

Comparative Example 1

Preparation of an adhesive composition and formation of first and second adhesive layers were performed in the same manner as in Example 1, thereby preparing an adhesive tape. However, the adhesive tape was different from the adhesive tape of Example 1 in that a hard polyurethane foamed layer having a density of 0.6 g/cm$^3$, a compressive strength of 2890 gf/in$^2$, and a tensile strength of 28.28 kgf/in$^2$ was formed.

Comparative Example 2

An adhesive tape was prepared in the same manner as in Example 1 except that a polyethylene (PE) foamed layer was formed instead of a polyurethane foamed layer.

Comparative Example 3

Preparation of a rubber adhesive composition and formation of first and second adhesive layers were performed in the same manner as in Example 2, thereby preparing an adhesive tape. However, the adhesive tape was different from the adhesive tape of Example 2 in that a polyacryl foamed layer was formed instead of a polyurethane foamed layer.

Evaluation

Experimental Example 1: Shear Strength at High Temperature

Each of the adhesive tapes of Examples 1 to 2 and Comparative Examples 1 to 3 was cut into a size of 1 cm×1 cm, thereby preparing a specimen. Opposite surfaces of the specimen were adhered to a glass surface and a polycarbonate surface, respectively, placed in a hot chamber and then maintained at 80° C. for 30 minutes, followed by measurement of shear strength.

Experimental Example 2: Evaluation of Light Leakage and Separation

A 5 mm wide polycarbonate bezel was bonded to an upper side of a glass panel of a 55 inch TV using each of the adhesive tapes of Examples 1 to 2 and Comparative Examples 1 to 3, all of which were cut into a width of 5 mm. Next, the TV with the bezel bonded thereto was placed in an oven at 60° C. and left for 240 hours, and then observed to determine whether the TV suffered from light leakage and separation, followed by evaluation based on the following criteria. Evaluation results are shown in Table 1.

<Evaluation Criteria of Light Leakage>
O: No light leakage
X: Light leakage
<Evaluation Criteria of Separation>
O: No separation
X: Separation

TABLE 1

|  | Shear strength at high temperature (kg/cm$^2$) | Light leakage evaluation | Separation evaluation |
| --- | --- | --- | --- |
| Example 1 | 0.54 | O | O |
| Example 2 | 0.56 | O | O |
| Comparative Example 1 | 0.34 | O | X |
| Comparative Example 2 | 1.20 | X | O |
| Comparative Example 3 | 1.76 | X | O |

As shown in Table 1, it was ascertained that the optical adhesive films of Examples 1 to 2 achieved good results in both light leakage and separation evaluation, and thus exhibited good durability.

The invention claimed is:

1. An adhesive tape for use in bonding of a TV bezel, sequentially comprising:
   a first adhesive layer;
   an inner polyurethane foamed layer, having a density of 0.1 g/cm$^3$ to 0.5 g/cm$^3$; and
   a second adhesive layer,
   wherein the polyurethane foamed layer has pores with an average diameter of 50 microns to 200 microns,
   wherein the polyurethane foamed layer has a thickness of 0.2 mm to less than 5.0 mm; and
   wherein the adhesive tape has a width of 1 mm to 7 mm,
   wherein the polyurethane foamed layer has a compressive strength of 100 gf/in$^2$ to 2000 gf/in$^2$,
   wherein the polyurethane foamed layer has a tensile strength of 2 kgf/in$^2$ to 20 kgf/in$^2$, and
   wherein the adhesive layers comprise at least one of acrylic adhesives, rubber adhesives, silicone adhesives, or combinations thereof.

2. The adhesive tape for use in bonding of a TV bezel according to claim 1, wherein the adhesive tape has a shear strength of 0.3 kg/cm$^2$ to 1.0 kg/cm$^2$ at 80° C.

* * * * *